(12) United States Patent
Tanaka et al.

(10) Patent No.: US 9,190,213 B2
(45) Date of Patent: Nov. 17, 2015

(54) METHOD OF MANUFACTURING MULTILAYER CERAMIC CAPACITOR AND MULTILAYER CERAMIC CAPACITOR

(71) Applicant: Murata Manufacturing Co., Ltd., Nagaokakyo-shi, Kyoto-fu (JP)

(72) Inventors: Junya Tanaka, Nagaokakyo (JP); Daisuke Hamada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 48 days.

(21) Appl. No.: 13/764,829

(22) Filed: Feb. 12, 2013

(65) Prior Publication Data
US 2013/0208398 A1 Aug. 15, 2013

(30) Foreign Application Priority Data

Feb. 13, 2012 (JP) .................. 2012-028259

(51) Int. Cl.
*H01G 4/30* (2006.01)
*H01G 4/012* (2006.01)
*H01G 4/12* (2006.01)

(52) U.S. Cl.
CPC .............. *H01G 4/306* (2013.01); *H01G 4/012* (2013.01); *H01G 4/12* (2013.01); *H01G 4/30* (2013.01); *Y10T 29/43* (2015.01)

(58) Field of Classification Search
CPC ........... H01G 4/012; H01G 4/12; H01G 4/30; H01G 4/306
USPC .................... 361/303, 321.2, 301.4
See application file for complete search history.

(56) References Cited

U.S. PATENT DOCUMENTS 8,559,160 B2 * 10/2013 Kim et al. ............. 361/303
2010/0085682 A1 4/2010 Abe et al.

FOREIGN PATENT DOCUMENTS

| CN | 101714455 A | | 5/2010 |
|---|---|---|---|
| JP | 1-89725 U | | 6/1989 |
| JP | 04171708 A | * | 6/1992 |
| JP | 06-013259 A | | 1/1994 |
| JP | 2002-184648 A | | 6/2002 |
| JP | 2004179349 A | * | 6/2004 |
| JP | 2004179436 A | * | 6/2004 |

(Continued)

OTHER PUBLICATIONS

Official Communication issued in corresponding Chinese Patent Application No. 2013100413334, mailed on Apr. 24, 2015.

*Primary Examiner* — David M Sinclair
(74) *Attorney, Agent, or Firm* — Keating & Bennett, LLP

(57) ABSTRACT

A rectangular or substantially rectangular parallelepiped chip including first and second end surfaces and first and second side surfaces is produced by cutting a mother block along a first direction in a portion where, of conductive layers that are adjacent to each other in a stacking direction, a first one is present and a second one is not present and cutting of the mother block along a second direction in a portion where, of the conductive layers that are adjacent to each other in the stacking direction, the second one is present and the first one is not present. A first internal electrode formed from the first conductive layer is exposed at the first end and side surfaces and not exposed at either of the second end and side surfaces. A second internal electrode formed from the second conductive layer is exposed at the second end and side surfaces and not exposed at either of the first end and side surfaces.

8 Claims, 15 Drawing Sheets

(56) References Cited

FOREIGN PATENT DOCUMENTS

| JP | 2005-101038 A | | 4/2005 |
|----|---------------|---|--------|
| JP | 2007-005595 A | | 1/2007 |
| JP | 2010-092896 A | | 4/2010 |
| JP | 2010093136 A | * | 4/2010 |
| JP | 2011-3845 A | | 1/2011 |

* cited by examiner

METHOD OF MANUFACTURING MULTILAYER CERAMIC CAPACITOR AND MULTILAYER CERAMIC CAPACITOR

BACKGROUND OF THE INVENTION

1. Field of the Invention

The present invention relates to a method of manufacturing a multilayer ceramic capacitor and to a multilayer ceramic capacitor.

2. Description of the Related Art

Recently, with miniaturization of electronic devices, such as cellular phones, personal computers, digital cameras, and digital audio devices, a great demand has emerged for reduced size and increased capacity of multilayer ceramic capacitors incorporated in the electronic devices.

A potential method of increasing the capacity of a multilayer ceramic capacitor without increasing its size is a method of increasing the area where internal electrodes face each other. One such example method of increasing the area where internal electrodes face each other is described in Japanese Unexamined Patent Application Publication No. 6-13259. This method includes producing a green chip in which both of first and second internal electrodes are exposed at each of first and second side surfaces and then forming a ceramic layer on each of the first and second side surfaces.

Unfortunately, for the method described in Japanese Unexamined Patent Application Publication No. 6-13259, if a ceramic layer between the first and second internal electrodes is thin, the first and second internal electrodes may be short-circuited. To address this issue, it is difficult for the ceramic layer to have a sufficiently small thickness, it is thus necessary to reduce the number of stacked layers with the aim of reducing the size, and an increase in the capacity is hard to achieve. Accordingly, a small high-capacity multilayer ceramic capacitor is difficult to obtain.

SUMMARY OF THE INVENTION

Preferred embodiments of the present invention provide a method by which a small high-capacity multilayer ceramic capacitor can be manufactured.

According to preferred embodiments of the present invention, a method of manufacturing a multilayer ceramic capacitor includes preparing ceramic green sheets each including a surface on which rectangular or substantially rectangular conductive layers extending along a first direction and a second direction perpendicular or substantially perpendicular to the first direction are formed, producing a mother block by stacking the ceramic green sheets such that the conductive layers on the neighboring ceramic green sheets are displaced along the first and second directions, and producing a rectangular or substantially rectangular parallelepiped chip including first and second end surfaces and first and second side surfaces by cutting the mother block along the first direction in a portion where, of the conductive layers adjacent to each other in a stacking direction, a first one is present and a second one is not present and cutting the mother block along the second direction in a portion where, of the conductive layers adjacent to each other in the stacking direction, the second one is present and the first one is not present. The first one of the conductive layers forms a first internal electrode, the second one of the conductive layers forms a second internal electrode, the first internal electrode is exposed at the first end surface and the first side surface and not exposed at either of the second end surface and the second side surface, and the second internal electrode is exposed at the second end surface and the second side surface and not exposed at either of the first end surface and the first side surface.

According to a specific aspect of a preferred embodiment of the present invention, a method of manufacturing a multilayer ceramic capacitor may further include forming an insulating layer on each of the first and second side surfaces of the chip and then firing the insulating layers.

According to another specific aspect of a preferred embodiment of the present invention of the method of manufacturing a multilayer ceramic capacitor, each of the insulating layers may include a ceramic layer.

According to yet another specific aspect of a preferred embodiment of the present invention of manufacturing a multilayer ceramic capacitor, the ceramic layer may be formed by attachment of a ceramic green sheet.

According to still another specific aspect of a preferred embodiment of the present invention of manufacturing a multilayer ceramic capacitor, the ceramic layer may be formed by application of ceramic paste.

According to another specific aspect of a preferred embodiment of the present invention of manufacturing a multilayer ceramic capacitor, the cutting the mother block may be performed by pressing down an object into the mother block.

According to yet another specific aspect of a preferred embodiment of the present invention of manufacturing a multilayer ceramic capacitor, a thickness of the ceramic green sheet may be equal or substantially equal to or larger than a thickness of the conductive layer.

According to another preferred embodiment of the present invention, a multilayer ceramic capacitor includes a rectangular or substantially rectangular parallelepiped ceramic element and a plurality of first and second internal electrodes. The ceramic element includes first and second principal surfaces, first and second side surfaces, and first and second end surfaces. The first and second principal surfaces extend along a longitudinal direction and a width direction. The first and second side surfaces extend along the longitudinal direction and a thickness direction. The first and second end surfaces extend along the width direction and the thickness direction. The plurality of first and second internal electrodes are spaced away from each other along the thickness direction in the ceramic element. The first internal electrodes are exposed at the first end surface and not exposed at the second end surface. The second internal electrodes are exposed at the second end surface and not exposed at the first end surface. Each of the first internal electrodes and the second internal electrodes includes a first end on a first side in the width direction and a second end on a second side in the width direction, the first end of the first internal electrode is positioned outside the first end of the second internal electrode in the width direction, the second end of the first internal electrode is positioned inside the second end of the second internal electrode in the width direction, and the first and second ends are thicker than portions other than the first and second ends.

According to another specific aspect of a preferred embodiment of the multilayer ceramic capacitor, a distance between the first and second internal electrodes may be equal to or larger than a thickness of each of the first and second internal electrodes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
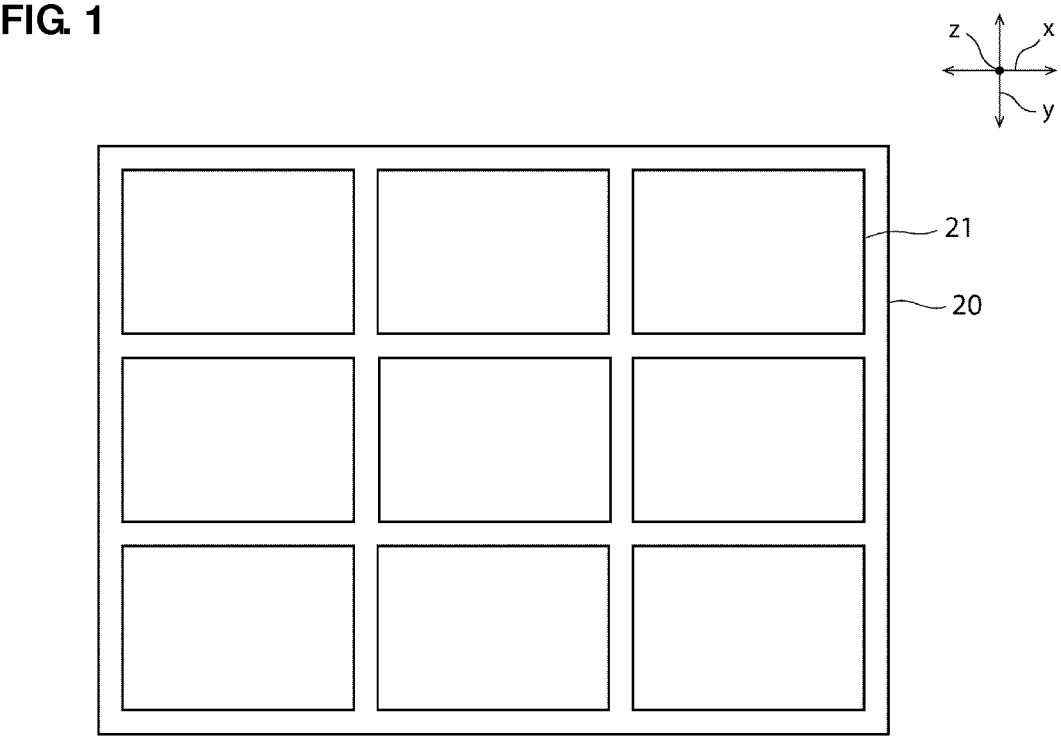
FIG. 1 is a simplified plan view of a ceramic green sheet in which conductive layers are arranged on its surface according to a preferred embodiment of the present invention.

Non-limiting examples of preferred embodiments of the present invention are described below. The preferred embodiments described below are for illustrative purposes only. The present invention is not limited to the preferred embodiments described below.

In the drawings referred to in the preferred embodiments, the components having virtually the same functions are referred to using the same reference numerals. The drawings referred to in the preferred embodiments are schematically illustrated, and the ratios in the dimensions of elements depicted in the drawings may differ from the actual ratios in the dimensions of elements in some cases. Among the drawings, the ratios in the dimensions of elements may differ. Specific dimensional rations of elements are to be understood in consideration of the description below.

First Preferred Embodiment

Figure 2:
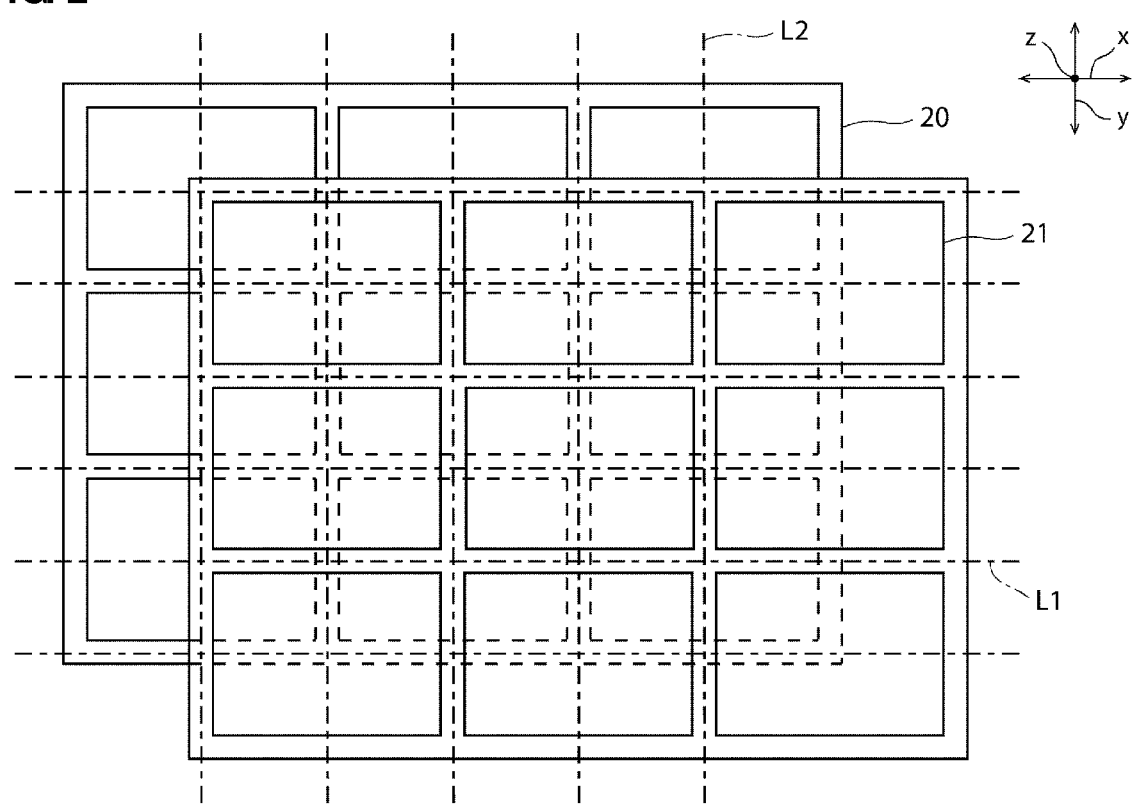
FIG. 2 is a schematic plan view for describing how ceramic green sheets are stacked according to a preferred embodiment of the present invention.
Figure 3:
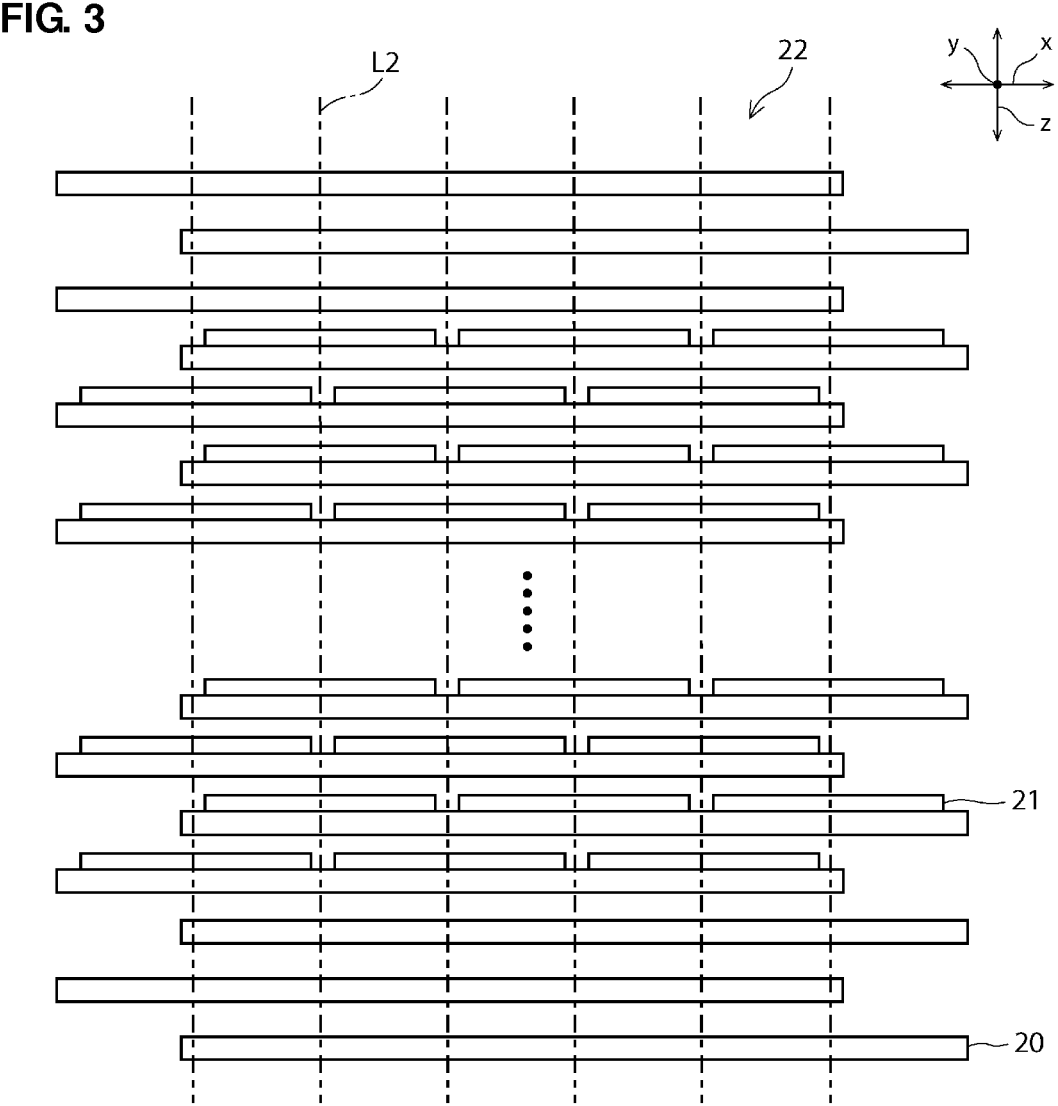
FIG. 3 is a simplified exploded side view of a mother laminate according to a preferred embodiment of the present invention.
Figure 4:
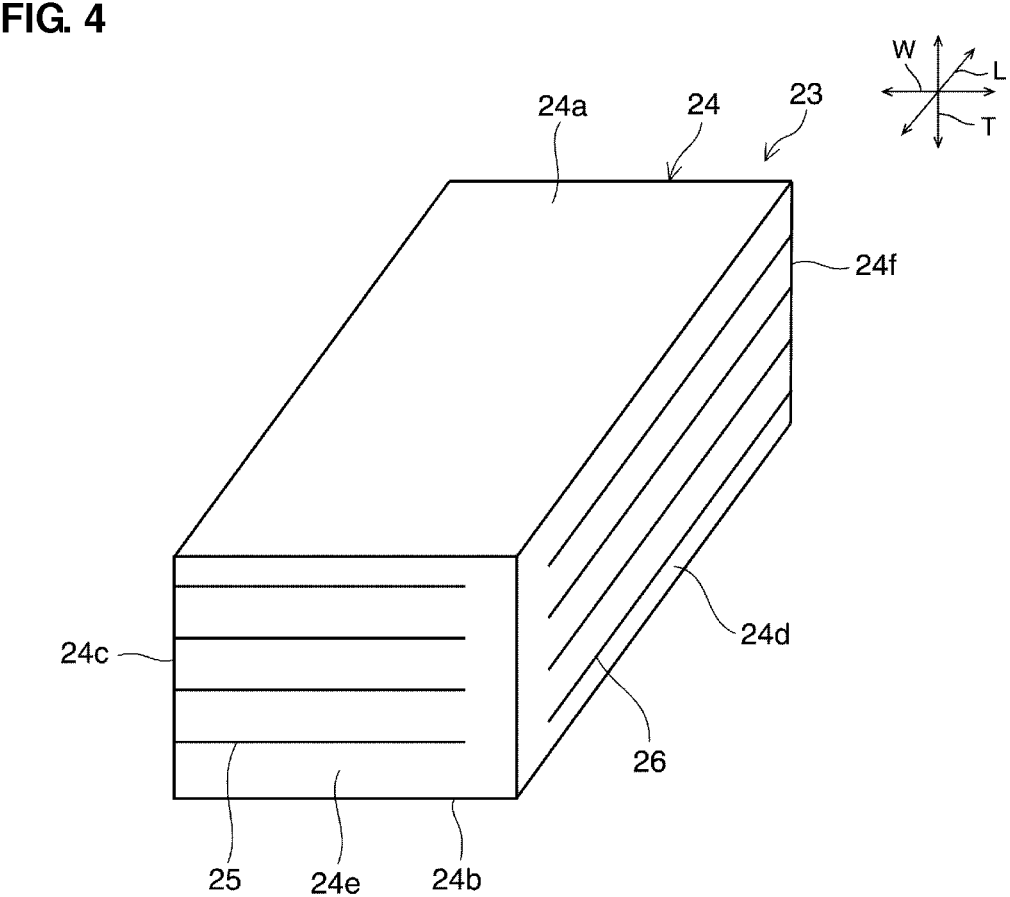
FIG. 4 is a simplified perspective view of a green chip according to a preferred embodiment of the present invention.
Figure 5:
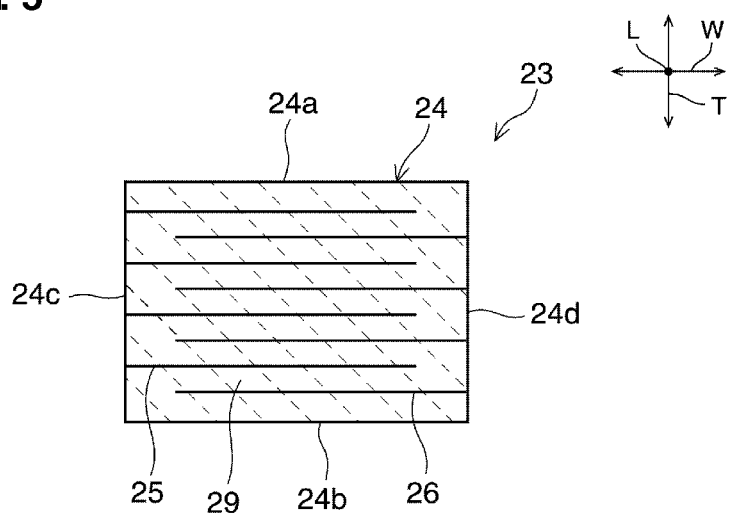
FIG. 5 is a simplified cross-sectional view of the green chip along the width direction and thickness direction according to a preferred embodiment of the present invention.
Figure 6:
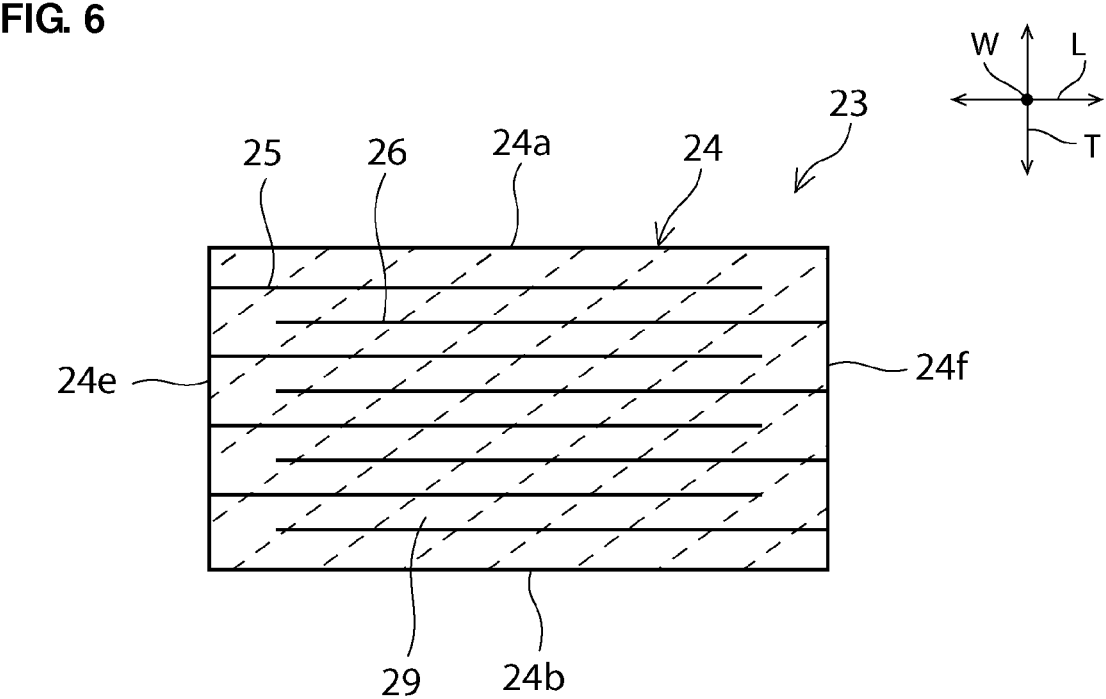
FIG. 6 is a simplified cross-sectional view of the green chip along the longitudinal direction and thickness direction according to a preferred embodiment of the present invention.
Figure 7:
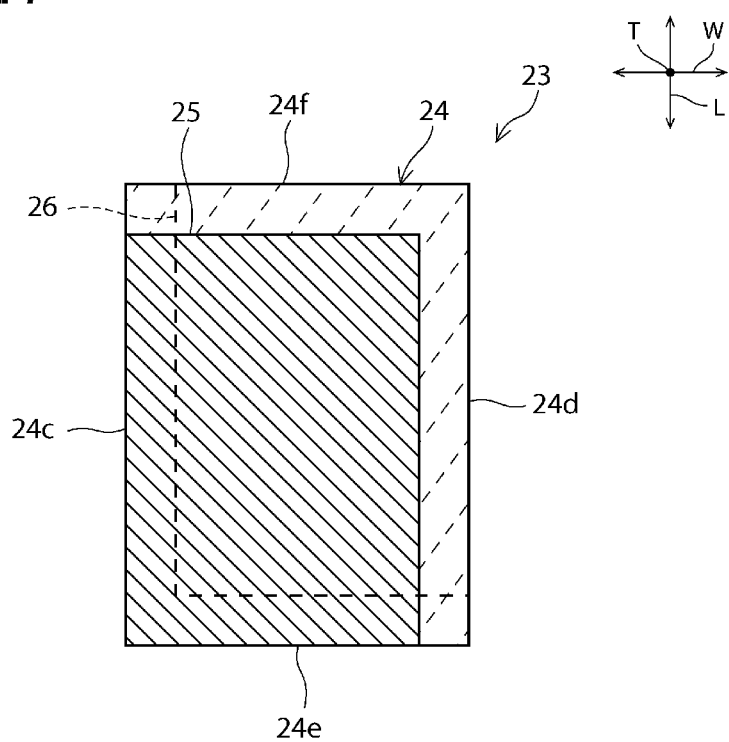
FIG. 7 is a simplified cross-sectional view of the green chip along the longitudinal direction and width direction according to a preferred embodiment of the present invention.
Figure 8:
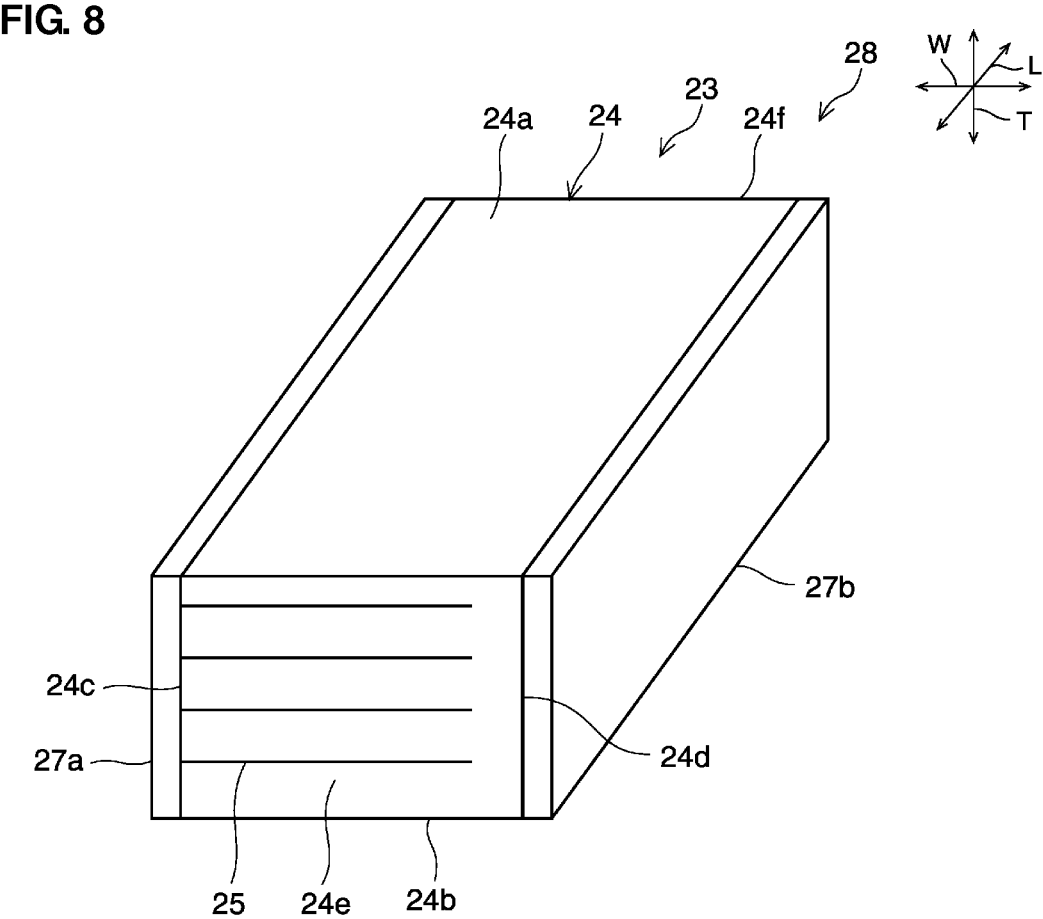
FIG. 8 is a simplified perspective view of a green ceramic element according to a preferred embodiment of the present invention.

FIG. 1 is a simplified plan view of a ceramic green sheet in which conductive layers are arranged on its surface according to the present preferred embodiment. FIG. 2 is a schematic plan view for describing how ceramic green sheets are stacked according to the present preferred embodiment. FIG. 3 is a simplified exploded side view of a mother laminate according to the present preferred embodiment. FIG. 4 is a simplified perspective view of a green chip according to the present preferred embodiment. FIG. 5 is a simplified cross-sectional view of the green chip along the width direction and thickness direction according to the present preferred embodiment. FIG. 6 is a simplified cross-sectional view of the green chip along the longitudinal direction and thickness direction according to the present preferred embodiment. FIG. 7 is a simplified cross-sectional view of the green chip along the longitudinal direction and width direction according to the present preferred embodiment. FIG. 8 is a simplified perspective view of a green ceramic element according to the present preferred embodiment.

Figure 9:
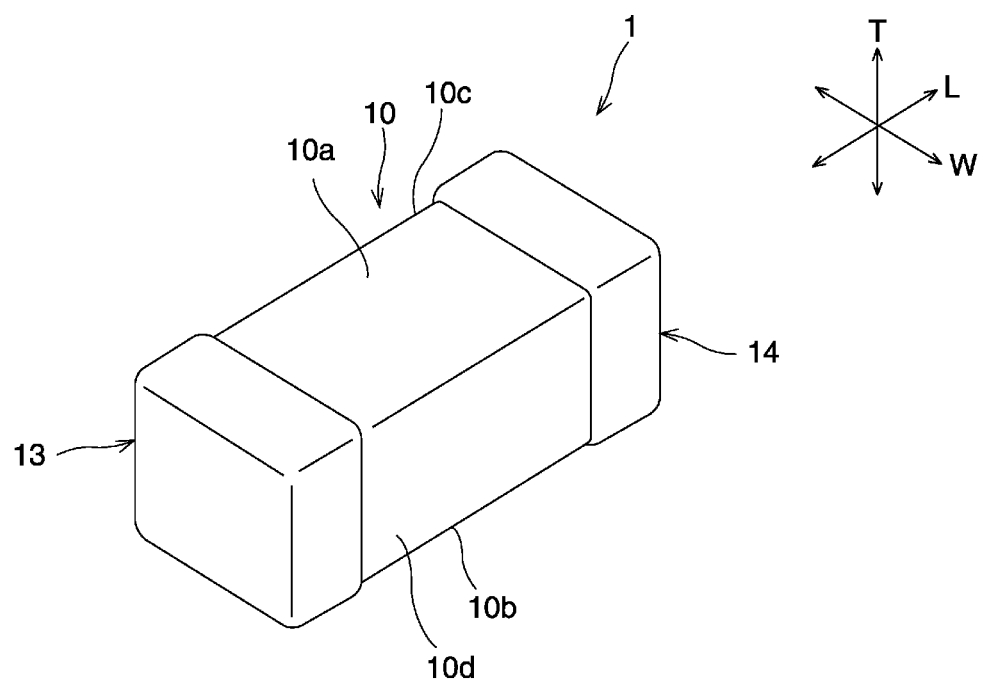
FIG. 9 is a simplified perspective view of a multilayer ceramic capacitor manufactured according to a preferred embodiment of the present invention.

One non-limiting example of a method of manufacturing a multilayer ceramic capacitor 1 illustrated in FIG. 9 is described with reference to FIGS. 1 to 8 in the present preferred embodiment.

First, a ceramic green sheet 20 illustrated in FIG. 1 is prepared. The ceramic green sheet 20 can be produced by printing of ceramic paste in a sheet form by a printing method, such as die coating, gravure coating, or micro gravure coating, and drying thereof, for example.

One non-limiting example of the kind of ceramic powder contained in the ceramic paste used in the production of the ceramic green sheet 20 can be dielectric ceramic powder. Specific non-limiting examples of the dielectric ceramic material can include barium titanate ($BaTiO_3$), calcium titanate ($CaTiO_3$), strontium titanate ($SrTiO_3$), and calcium zirconate ($CaZrO_3$).

Next, a plurality of rectangular or substantially rectangular conductive layers 21 for use in forming internal electrodes are formed on a surface of the ceramic green sheet 20 such that they are arranged in a matrix and spaced away from each other along the x direction and the y direction perpendicular to the x direction. In this way, the ceramic green sheet 20 including the surface on which the plurality of rectangular or substantially rectangular conductive layers 21 for use in forming the internal electrodes arranged in the matrix and spaced away from each other along the x direction and the y direction is prepared.

The conductive layers 21 can be formed by various printing methods, including screen printing, gravure printing, and ink-jet printing, for example.

The thickness of the ceramic green sheet 20 may preferably be equal to or larger than the thickness of the conductive layer 21. Specifically, the thickness of each of the ceramic green sheets 20 after firing may preferably be about 0.3 µm to about 3 µm, for example. The thickness of the conductive layer 21 after firing may preferably be about 0.3 µm to about 1.5 µm, for example. If the ceramic green sheet 20 is too thin, the ceramic green sheet 20 may be difficult to handle. In contrast, if the ceramic green sheet 20 is too thick, the performance (for example, electrostatic capacity) of the obtained multilayer ceramic capacitor 1 may be too low. If the conductive layers 21 are too thin, formed internal electrodes 25 and 26 may be too thin, a reduced density of the internal electrodes 25 and 26 may lead to a decrease in the electrostatic capacity of the obtained multilayer ceramic capacitor, and the performance may be low. In contrast, if the conductive layers 21 are too thick, a height difference between the portion where the conductive layers 21 are not disposed and the portion where the conductive layers 21 are disposed may be too large, structural defects may easily occur, and the reliability of the obtained multilayer ceramic capacitor may be low.

The thickness of the ceramic green sheet 20 after firing and the thickness of the conductive layer 21 after firing can be measured by microscopic observation of a cross section obtained by grinding of the obtained multilayer ceramic capacitor 1 from an end surface to a substantially central portion in the longitudinal direction L.

Next, a plurality of ceramic green sheets 20 on which no conductive layers 21 are formed on their surfaces are stacked, as illustrated in FIG. 3. After that, a plurality of ceramic green sheets 20 on which the conductive layers 21 are formed on their surfaces are stacked, as illustrated in FIGS. 2 and 3. At this time, the conductive layers 21 on the ceramic green sheets being adjacent in the z direction, which is the stacking direction, are displaced by half or about of its interval along the x direction and the y direction. After that, a further plurality of ceramic green sheets 20 on which no conductive layers 21 are formed on their surfaces are stacked, as illustrated in FIG. 3. In this way, the mother block 22 including the conductive layers 21 formed therein is produced.

The mother block 22 may also be subjected to various kinds of pressing, such as hydrostatic pressure pressing, if needed.

Next, the green chip 23 illustrated in FIGS. 4 to 7 is produced from the mother block 22 by cutting of the mother block 22 along the x direction and the y direction. Specifically, the mother block 22 is cut along a plurality of cut lines L1 (see FIG. 2) extending along the x direction (first direction) in substantially central portions in the y direction (second direction) of the conductive layers 21. With this, the mother block 22 is cut along a plurality of cut lines L2 extending along the y direction in substantially central portions in the x direction of the conductive layers 21. The cutting along the cut lines L1 and L2 divides the mother block 22 into the plurality of green chips 23.

Non-limiting examples of the method of cutting the mother block 22 can include cutting with a blade pressed down into the mother block 22, dicing, and laser cutting. Among them, cutting with a blade pressed down into the mother block 22 may be preferable because the time required to cut the mother block 22 can be short, the portions removed in cutting can be smaller than that when dicing and other methods are used, and thus the efficiency in using the material can be increased.

Specifically, the mother block 22 in the present preferred embodiment is cut by movement of a blade (not illustrated) along the thickness direction.

As illustrated in FIGS. 4 to 7, the green chip 23 includes a chip main body 24 having a rectangular or substantially rectangular parallelepiped shape. The chip main body 24 includes a pair of principal surfaces 24a and 24b, a pair of side surfaces 24c and 24d, and a pair of end surfaces 24e and 24f. The principal surfaces 24a and 24b extend along the longitudinal direction L and the width direction W. The side surfaces 24c and 24d extend along the longitudinal direction L and the thickness direction T. The end surfaces 24e and 24f extend along the width direction W and the thickness direction T.

The plurality of rectangular or substantially rectangular parallelepiped first and second internal electrodes 25 and 26 formed from the conductive layers 21 are arranged in the chip main body 24. The plurality of first internal electrodes 25 and the plurality of second internal electrodes 26 are spaced away from each other along the thickness direction T in an alternating manner. The first internal electrode 25 and the second internal electrode 26 that are adjacent to each other in the thickness direction T face each other such that a ceramic layer 29 is disposed therebetween.

The first and second internal electrodes 25 and 26 are arranged along the longitudinal direction L and the width direction W. The first internal electrodes 25 are exposed at the end surface 24e and the side surface 24c. The first internal electrodes 25 are not exposed at either of the end surface 24f and the side surface 24d. The second internal electrodes 26 are exposed at the end surface 24f and the side surface 24d. The second internal electrodes 26 are not exposed at either of the end surface 24e and the side surface 24c. That is, the first internal electrodes 25 are exposed at the end surface 24e and the side surface 24c, whereas the second internal electrodes 26 are not exposed at the end surface 24e and the side surface 24c. The second internal electrodes 26 are exposed at the side surface 24d and the end surface 24f, whereas the first internal electrodes 25 are not exposed at the side surface 24d and the end surface 24f.

Next, the ceramic layers 27a and 27b are formed on the side surfaces 24c and 24d, respectively, to which the first and second internal electrodes 25 and 26 are exposed, respectively, as illustrated in FIG. 8. In this way, a green ceramic element 28 in which the internal electrodes 25 and 26 are exposed at only the end surfaces 24e and 24f, respectively, is produced.

The ceramic layers 27a and 27b may be formed by attachment of ceramic green sheets, for example. In this case, the ceramic layers 27a and 27b can have a high degree of uniformity in thickness. Alternatively, the ceramic layers 27a and 27b may be formed by application of ceramic paste and drying thereof.

Before the attachment of the ceramic layers 27a and 27b, adhesive may be applied on the side surfaces 24c and 24d. The applied adhesive is removed by being burnt down in a subsequent firing process.

The green ceramic element 28 may preferably be subjected to barrel polishing as appropriate to make ridges and corners round.

Next, the green ceramic element 28 is fired to obtain a ceramic element 10 including the first and second internal electrodes 25 and 26 illustrated in FIG. 9. After that, first and second external electrodes 13 and 14 are formed on the ceramic element 10, and the multilayer ceramic capacitor is complicated. The first and second external electrodes 13 and 14 can be formed by a method of applying conductive paste using plating, dipping, or other technique and then firing thereof, for example.

A case of post-firing of forming the first and second external electrodes 13 and 14 after firing is described above in the present preferred embodiment. The present invention is not limited to that case. The external electrodes may be formed by co-firing of, after applying conductive paste to a green ceramic element, firing the conductive paste and the green ceramic element at the same time, for example.

Figure 10:
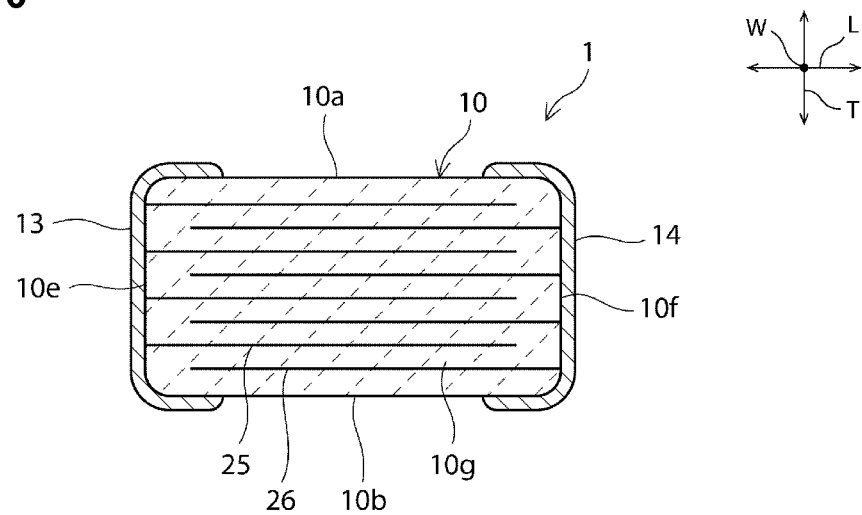
FIG. 10 is a simplified cross-sectional view of the multilayer ceramic capacitor manufactured according to a preferred embodiment of the present invention along the longitudinal direction and thickness direction.
Figure 11:
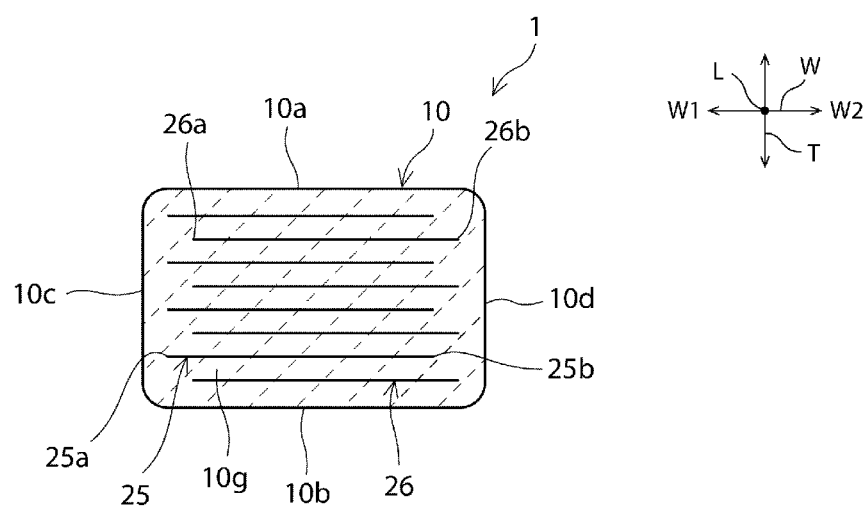
FIG. 11 is a simplified cross-sectional view of the multilayer ceramic capacitor manufactured according to a preferred embodiment of the present invention along the width direction and thickness direction.
Figure 12:
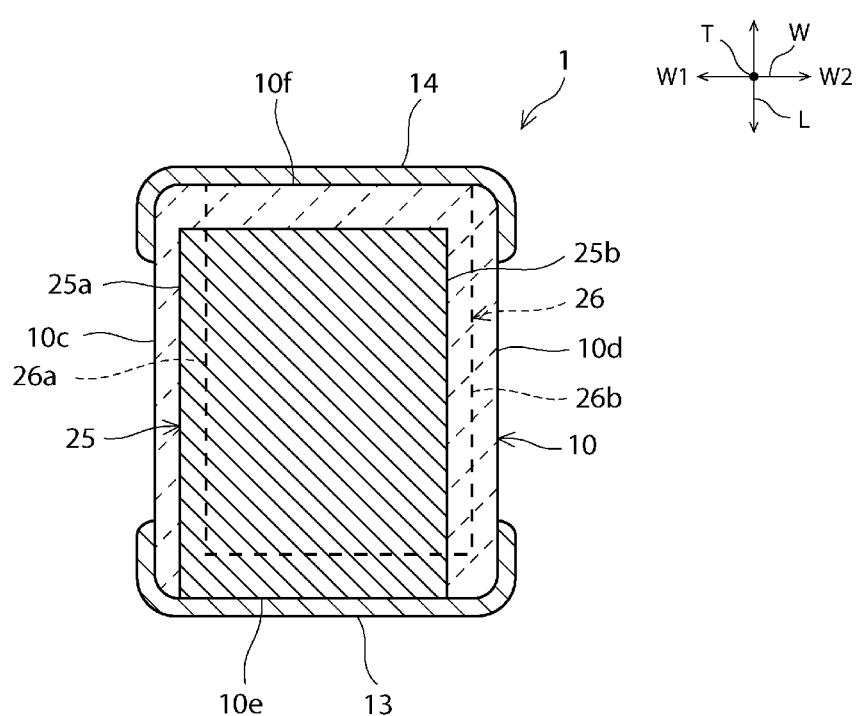
FIG. 12 is a simplified cross-sectional view of the multilayer ceramic capacitor manufactured according to a preferred embodiment of the present invention along the longitudinal direction and width direction.

FIG. 9 is a simplified perspective view of a multilayer ceramic capacitor manufactured according to the present preferred embodiment. FIG. 10 is a simplified cross-sectional view of the multilayer ceramic capacitor manufactured according to the present preferred embodiment along the longitudinal direction and thickness direction. FIG. 11 is a simplified cross-sectional view of the multilayer ceramic capacitor manufactured according to the present preferred embodiment along the width direction and thickness direction. FIG. 12 is a simplified cross-sectional view of the multilayer ceramic capacitor manufactured according to the present preferred embodiment along the longitudinal direction and width direction.

As illustrated in FIGS. 9 to 12, the multilayer ceramic capacitor 1 includes the rectangular or substantially rectangular parallelepiped ceramic element 10. The ceramic element 10 includes first and second principal surfaces 10*a* and 10*b* extending along the longitudinal direction L and the width direction W, first and second side surfaces 10*c* and 10*d* extending along the thickness direction T and the longitudinal direction L, and first and second end surfaces 10*e* and 10*f* extending along the thickness direction T and the width direction W.

In the present invention, the "rectangular or substantially rectangular parallelepiped" includes a rectangular parallelepiped having chamfered or rounded corners and ridges. That is, "rectangular or substantially rectangular parallelepiped" components include general components including first and second principal surfaces, first and second side surfaces, and first and second end surfaces. The principal surfaces, side surfaces, and end surfaces may have asperities partially or entirely.

The ceramic element 10 can have any dimensions. The ceramic element 10 may have dimensions of about 0.1 mm to about 3.0 mm in height, about 0.2 mm to about 4.0 mm in length, and about 0.1 mm to about 3.0 mm in width, for example.

The ceramic element 10 is made of an appropriate ceramic material. For example, the ceramic element 10 can be made of a dielectric ceramic material. Specific non-limiting examples of the dielectric ceramic material can include barium titanate ($BaTiO_3$), calcium titanate ($CaTiO_3$), strontium titanate ($SrTiO_3$), and calcium zirconate ($CaZrO_3$).

As illustrated in FIGS. 10 and 11, the plurality of rectangular or substantially rectangular first and second internal electrodes 25 and 26 are evenly spaced along the thickness direction T in an alternating manner in the ceramic element 10. Each of the first and second internal electrodes 25 and 26 is parallel or substantially parallel with the first and second principal surfaces 10*a* and 10*b*. The first and second internal electrodes 25 and 26 face each other in the thickness direction T such that a ceramic layer 10*g* is disposed therebetween.

The distance between the first and second internal electrodes 25 and 26 along the thickness direction T, that is, the thickness of the ceramic layer 10*g* may preferably be equal to or larger than that of each of the first and second internal electrodes 25 and 26. Specifically, the thickness of the ceramic layer 10*g* may preferably be about 0.3 μm to about 3 μm, for example. The thickness of each of the first and second internal electrodes 25 and 26 may preferably be about 0.3 μm to about 3.0 μm, and more preferably, about 0.1 μm to about 3.0 μm, for example.

As illustrated in FIG. 10, the first internal electrodes 25 are exposed at the first end surface 10*e* and not exposed at the first and second principal surfaces 10*a* and 10*b*, the second end surface 10*f*, and the first and second side surfaces 10*c* and 10*d*. The second internal electrodes 26 are exposed at the second end surface 10*f* and not exposed at the first and second principal surfaces 10*a* and 10*b*, the first end surface 10*e*, and the first and second side surfaces 10*c* and 10*d*.

As illustrated in FIGS. 11 and 12, a W1-side end 25*a* of each of the first internal electrodes 25 in the width direction W is positioned outside (on the W1 side with respect to) of a W1-side end 26*a* of each of the second internal electrodes 26 in the width direction W. A W2-side end 25*b* of each of the first internal electrodes 25 in the width direction W is positioned inside (on the W1 side with respect to) of a W2-side end 26*b* of each of the second internal electrodes 26 in the width direction W. That is, in a cross section along the width direction W and the thickness direction T, the first and second internal electrodes 25 and 26 are arranged in a staggered pattern along the thickness direction T, and the ends 25*a*, 25*b*, 26*a*, and 26*b* are located at different positions in the width direction W.

The first and second internal electrodes 25 and 26 can be made of an appropriate conductive material. The first and second internal electrodes 25 and 26 can be made of, for example, a metal selected from the group consisting of nickel, copper, silver, palladium, and gold or an alloy that contains one or more metals selected from the group consisting of nickel, copper, silver, palladium, and gold (e.g., an alloy of silver and palladium).

As illustrated in FIGS. 9, 10, and 12, the multilayer ceramic capacitor 1 includes the first and second external electrodes 13 and 14. As illustrated in FIGS. 10 and 12, the first external electrode 13 is connected to the first internal electrodes 25, whereas the second external electrode 14 is connected to the second internal electrodes 26.

The first and second external electrodes 13 and 14 can be made of an appropriate conductive material. The first and second external electrodes 13 and 14 may be made of a laminate of a plurality of conductive films.

In the present preferred embodiment, specifically, each of the first and second external electrodes 13 and 14 includes one or more primary layers and one or more plating layers formed on the primary layers.

Each of the primary layers can be made of a sintered metallic layer, a plating layer, or a conductive resin layer in which a conductive filler is added to a thermosetting resin or photo-curable resin. The sintered metallic layer may be formed by co-firing with the first and second internal electrodes 25 and 26, or alternatively, may be formed by post-firing of applying and baking conductive paste.

The conductive material contained in the primary layer is not particularly limited. Specific non-limiting examples of the conductive material contained in the primary layer can include metals, such as copper, nickel, silver, palladium, and gold, and alloys that contain one or more of these metals, such as an alloy of silver and palladium.

The primary layer can have a maximum thickness of about 20 μm to about 100 μm, for example.

The plating layer can be made of a metal, such as copper, nickel, tin, silver, palladium, or gold, or an alloy that contains one or more of these metals, such as an alloy of silver and palladium, for example.

The maximum thickness of the single plating layer can be about 1 μm to about 10 μm, for example.

A resin layer for stress relaxation may be arranged between the primary layer and the plating layer.

Figure 13:
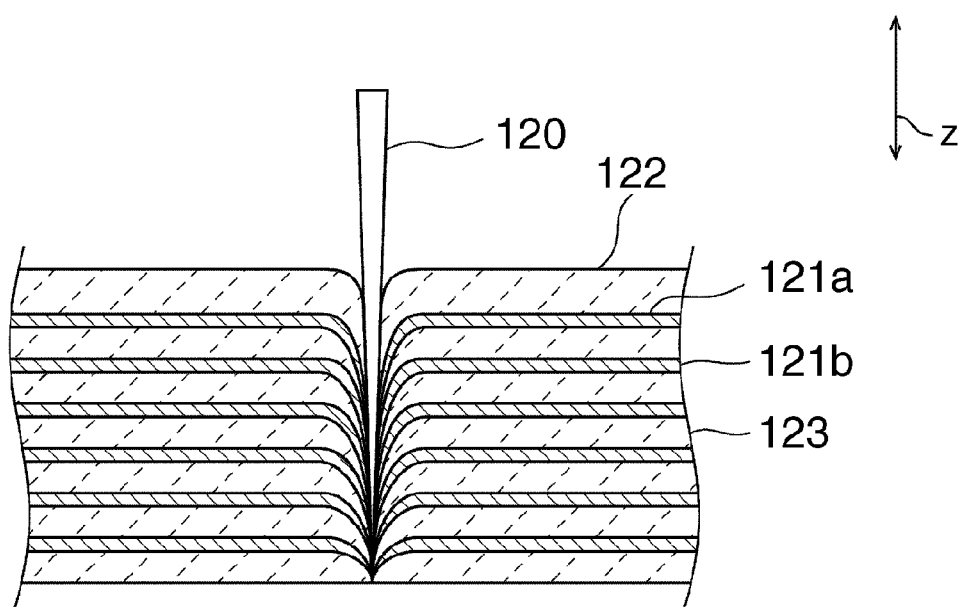
FIG. 13 is a simplified cross-sectional view for describing a process for cutting a portion where conductive layers are disposed on ceramic green sheets.

As illustrated in FIG. 13, when a portion of a mother block 122 where both conductive layers 121*a* for use in forming the first electrodes and conductive layers 121*b* for use in forming the second electrodes are disposed is cut with a blade 120 pressed down and moved in the stacking direction, the cut portion and its adjacent area of ceramic green sheets 123 and the conductive layers 121*a* and 121*b* are displaced in the z direction with the movement of the blade 120. This may lead to a short circuit in the first and second electrodes, and thus may be a cause of shortings.

In contrast, in the present preferred embodiment, as illustrated in FIG. 2, the mother block 22 is cut along the cut lines L1 extending along the first direction (x direction) in substantially central portions of the conductive layers 21 in the second direction (y direction) and is cut along the cut lines L2 extending along the y direction in substantially central portions of the conductive layers 21 in the x direction. The cut lines L1 and L2 pass through not all of the conductive layers 21 on the ceramic green sheets 20. The cut lines L1 and L2 pass through the conductive layers 21 every two ceramic green sheets 20. Each of the cut lines L1 and L2 passes through only either the conductive layers 21 for use in forming the first electrodes 25 or the conductive layers 21 for use in forming the second electrodes 26. In this manner, in the present preferred embodiment, because the distance between the neighboring conductive layers 21 is long, even if the conductive layers 21 and ceramic green sheets 20 are deformed at the time of cutting the mother block 22, the conductive layers 21 that are adjacent to each other in the z direction do not easily come into contact with each other. If the neighboring conductive layers 21 come into contact with each other, because both the conductive layers 21 coming into contact with each other form the first internal electrodes 25 or the second internal electrodes 26, this contact is not a cause of a short circuit between the first and second internal electrodes 25 and 26. Accordingly, if the ceramic green sheets 20 are thin, because short circuits between the first and second internal electrodes 25 and 26 can be reliably reduced, the risk of a short circuit can be significantly reduced, and a high-capacity multilayer ceramic capacitor can be manufactured.

Because a short circuit between the first and second internal electrodes 25 and 26 can be reliably reduced, the speed of cutting the mother block 22 can be enhanced. Accordingly, the time required to cut the mother block 22 can be shortened. As a result, the time required to manufacture the multilayer ceramic capacitor 1 can be shortened.

As in the present preferred embodiment, post-formation of the ceramic layers 27a and 27b enables the ceramic layers 27a and 27b to have a reduced thickness. Accordingly, the area where the first and second internal electrodes 25 and 26 face each other can be increased. Thus, a higher-capacity multilayer ceramic capacitor can be manufactured.

Because only one of the first and second internal electrodes 25 and 26 is preferably exposed at the side surfaces 24c and 24d of the chip main body 24, the proportion of the area of the first and second internal electrodes 25 and 26 on the side surfaces 24c and 24d is small. Thus, the strength of adhesion between the chip main body 24 and each of the ceramic layers 27a and 27b can be enhanced. Accordingly, water or other liquids or gas do not easily penetrate the ceramic element 10, and the multilayer ceramic capacitor 1 having satisfactory reliability is obtainable.

In terms of obtainment of the multilayer ceramic capacitor 1 having more satisfactory reliability, the thickness of the ceramic green sheet 20 may preferably be equal to or larger than that of the conductive layer 21, and more preferably, be larger than that of the conductive layer 21. However, if the thickness of the ceramic green sheet 20 is too much larger than that of the conductive layer 21, the large thickness of the ceramic green sheet 20 may result in an insufficient capacity. The thickness of the ceramic green sheet 20 may preferably be no more than about 3.0 times, and more preferably, no more than about 2.0 times the thickness of the conductive layer 21, for example.

Another possible case is discussed below where a first side end of the first internal electrode in the width direction and a first side end of the second internal electrode in the width direction are aligned in the width direction and a second side end of the first internal electrode in the width direction and a second side end of the second internal electrode are aligned in the width direction. In this case, however, in the ceramic element, a portion where both the first and second internal electrodes are disposed is adjacent to a portion where neither of the first and second internal electrodes is disposed. Thus, there is a large thickness difference in the border region between the portion where both the first and second internal electrodes are disposed and the portion where neither of the first and second internal electrodes is disposed. Electric fields easily concentrate on the border region between the portion where both the first and second internal electrodes are disposed and the portion where neither of the first and second internal electrodes is disposed. In addition, structural defects easily occur in the inside of the ceramic element, and as a result, water or other liquids or gases easily penetrate the ceramic element. Accordingly, the reliability of the multilayer ceramic capacitor may deteriorate.

In contrast, in the present preferred embodiment, a region where one of the first and second internal electrodes 25 and 26 is disposed is present between a region where both the first and second internal electrodes 25 and 26 are disposed and a region where neither of the first and second internal electrodes 25 and 26 is disposed. This prevents a sharp change in the thickness. Accordingly, concentration of electric fields can be significantly reduced and prevented, the occurrence of structural defects can be significantly reduced and prevented, and penetration of water can be significantly reduced and prevented. As a result, more satisfactory reliability is obtainable.

Figure 14:
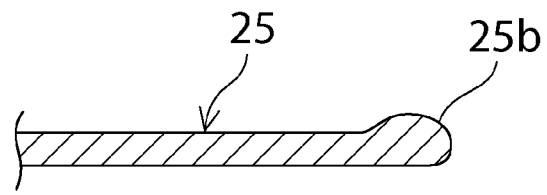
FIG. 14 is a schematic cross-sectional view of an end of an internal electrode.

As illustrated in FIG. 14, the uncut end 25b of the first internal electrode 25 is thicker than the other portions. Similarly, the uncut end 26a of the second internal electrode 26 is thicker than the other portions. When the ends 25b of the plurality of first internal electrodes 25 are stacked in the thickness direction T, the thicknesses of the ends 25b are accumulated, as a result, there is a large height difference between the ends and the other portions, and structural defects easily occur inside the ceramic element 10. Accordingly, the locations of the ends 25b of the plurality of first internal electrodes 25 in the width direction W may preferably scatter. Similarly, the locations of the ends 26a of the plurality of second internal electrodes 26 in the width direction W may preferably scatter.

In the above-described preferred embodiment, a non-limiting example in which a ceramic layer is disposed on a side surface of a chip is described. In place of the ceramic layer, an insulating layer, such as a resin layer or a glass layer, may be disposed.

Other Preferred Embodiments

Figure 15:
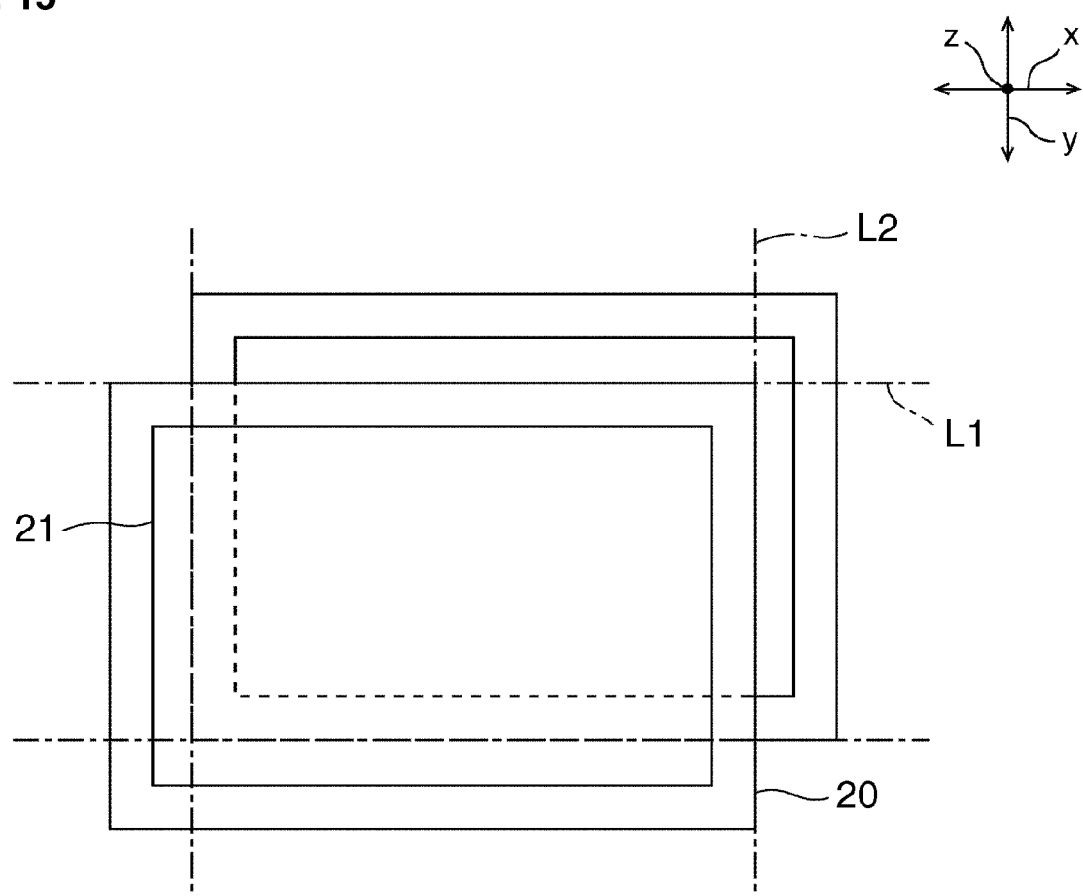
FIG. 15 is a schematic plan view for describing how ceramic green sheets are stacked according to a variation of a preferred embodiment of the present invention.

FIG. 15 is a schematic plan view for describing how ceramic green sheets are stacked according to a variation of a preferred embodiment of the present invention. As illustrated in FIG. 15, only one conductive layer 21 may be disposed on one ceramic green sheet 20. In this case, the conductive layers 21 that are adjacent to each other in the stacking direction are required to be displaced along both the x direction and the y direction. The amount of the displacement is not particularly limited.

Preferred embodiments of the present invention are described in detail on the basis of a specific non-limiting example below. The present invention is not limited to the non-limiting example below and can be modified within the range where the scope thereof is not changed.

Example of Preferred Embodiments of Present Invention

A thousand multilayer ceramic capacitors 1 according to the above-described preferred embodiment were manufactured using the method described in the above-described preferred embodiment under the conditions described below.

Dimension of ceramic element 10 in longitudinal direction: 10 mm

Dimension of ceramic element 10 in width direction: 5 mm

Thickness of each of internal electrodes 25 and 26 (value measured using fluorescent X-rays in cross section): 0.3 µm Interval between neighboring conductive layers 21: 20 µm Number of stacked ceramic green sheets 20: 500

Thickness of ceramic green sheet 20 after firing: 1.5 µm, 0.7 µm, or 0.5 µm

After that, for 100 samples randomly extracted from the manufactured 1000 samples, the presence or absence of a short circuit between the first and second internal electrodes 25 and 26 was examined by measurement of insulation resistance between the first and second external electrodes 13 and 14, and the incidence of short circuits was determined. The results are listed in Table 1 below.

Comparative Example 1

A thousand multilayer ceramic capacitors were manufactured in the same way as in the above-described Example, except that the conductive layers 21 fully overlap each other in the stacking direction. After that, for 100 samples randomly extracted from the manufactured 1000 samples, the presence or absence of a short circuit between the first and second internal electrodes was examined, and the incidence of short circuits was determined. The results are listed in Table 1 below.

Comparative Example 2

A thousand multilayer ceramic capacitors were manufactured in the same way as in Comparative Example 1, except that the mother block was cut by dicing. After that, for 100 samples randomly extracted from the manufactured 1000 samples, the presence or absence of a short circuit between the first and second internal electrodes was examined, and the incidence of short circuits was determined. The results are listed in Table 1 below.

TABLE 1

| | | Incidence Of Short Circuits (%) | |
|---|---|---|---|
| | Example | Comparative Example 1 | Comparative Example 2 |
| Thickness (µm) of Ceramic Green Sheet | 1.5 | 3 | 95 | 3 |
| | 0.7 | 10 | 100 | 10 |
| | 0.5 | 20 | 100 | 50 |

The results in Table 1 reveal that the occurrence of short circuits between the first and second internal electrodes can be reduced by manufacture of multilayer ceramic capacitors in accordance with preferred embodiments of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a ceramic element including first and second principal surfaces extending along a longitudinal direction and a width direction, first and second side surfaces extending along the longitudinal direction and a thickness direction, and first and second end surfaces extending along the width direction and the thickness direction; and
   a plurality of first and second internal electrodes spaced away from each other along the thickness direction in the ceramic element; wherein
   the first internal electrodes are exposed at the first end surface and not exposed at the second end surface;
   the second internal electrodes are exposed at the second end surface and not exposed at the first end surface; and
   each of the first internal electrodes and the second internal electrodes includes a first end on a first side in the width direction and a second end on a second side in the width direction, the first end of the first internal electrode is positioned outside the first end of the second internal electrode in the width direction, the second end of the first internal electrode is positioned inside the second end of the second internal electrode in the width direction, the second ends of the first internal electrodes are scattered in the width direction so as to be disposed at different positions from one another in the width direction, the first ends of the second internal electrodes are scattered in the width direction so as to be disposed at different positions from one another in the width direction, the second end of each of the first internal electrodes is thicker than other portions of the first internal electrode in the width direction, and the first end of each of the second internal electrodes is thicker than other portions of the second internal electrode in the width direction.

2. The multilayer ceramic capacitor according to claim 1, wherein a distance between the first and second internal electrodes is equal to or larger than a thickness of each of the first and second internal electrodes.

3. The multilayer ceramic capacitor according to claim 1, wherein the ceramic element has a rectangular or substantially rectangular parallelepiped shape.

4. The multilayer ceramic capacitor according to claim 1, wherein each of the plurality of first and second internal electrodes has a rectangular or substantially rectangular parallelepiped shape.

5. The multilayer ceramic capacitor according to claim 1, wherein the ceramic element has dimensions of about 0.1 mm to about 3.0 mm in height, about 0.2 mm to about 4.0 mm in length, and about 0.1 mm to about 3.0 mm in width.

6. The multilayer ceramic capacitor according to claim 1, wherein the ceramic element includes a plurality of ceramic layers each having a thickness larger than that of each of the first and second internal electrodes.

7. The multilayer ceramic capacitor according to claim 1, wherein a thickness of each of the ceramic layers is about 0.3 µm to about 3 µm.

8. The multilayer ceramic capacitor according to claim 1, wherein a thickness of each of the first and second internal electrodes is about 0.3 µm to about 1.5 µm.

* * * * *